April 16, 1935.  N. D. LEVIN  1,997,588
PIT CAR LOADER
Original Filed Aug. 17, 1929  2 Sheets-Sheet 1
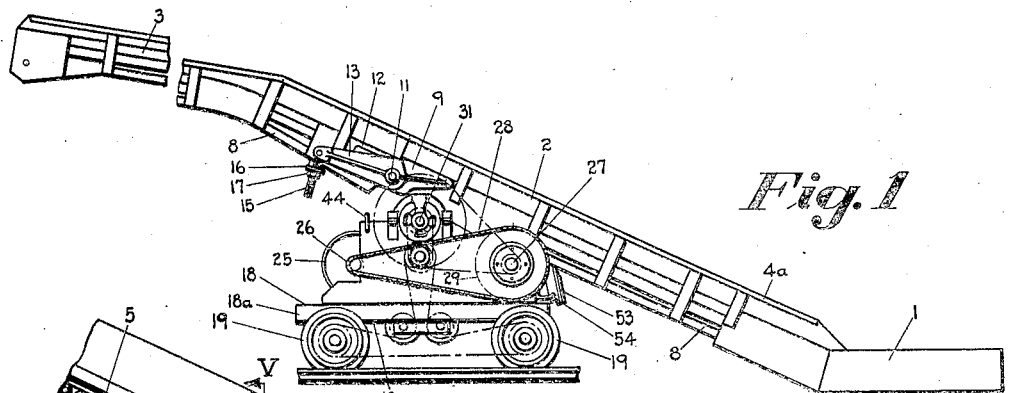

April 16, 1935.　　　N. D. LEVIN　　　1,997,588
PIT CAR LOADER
Original Filed Aug. 17, 1929　　2 Sheets-Sheet 2
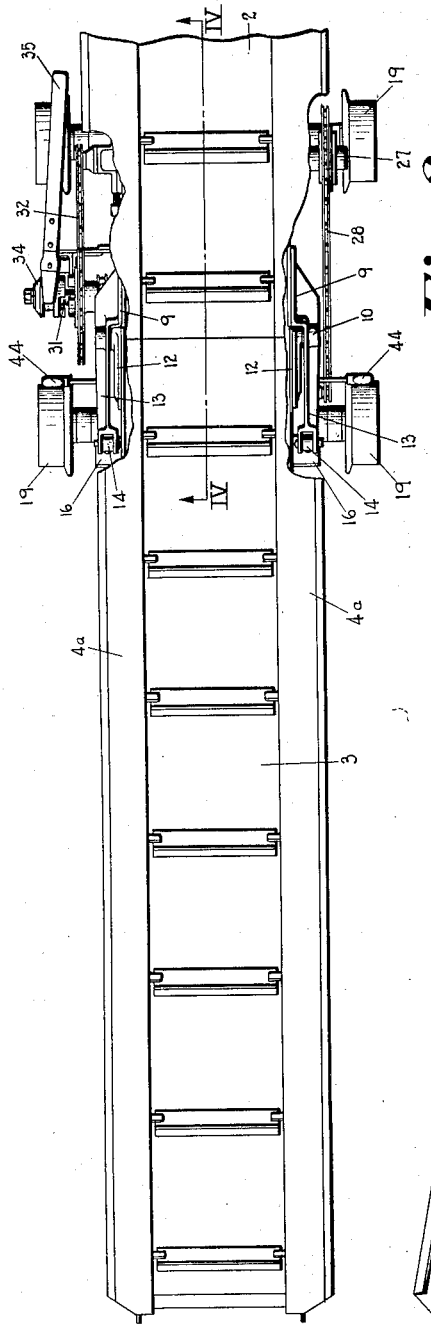
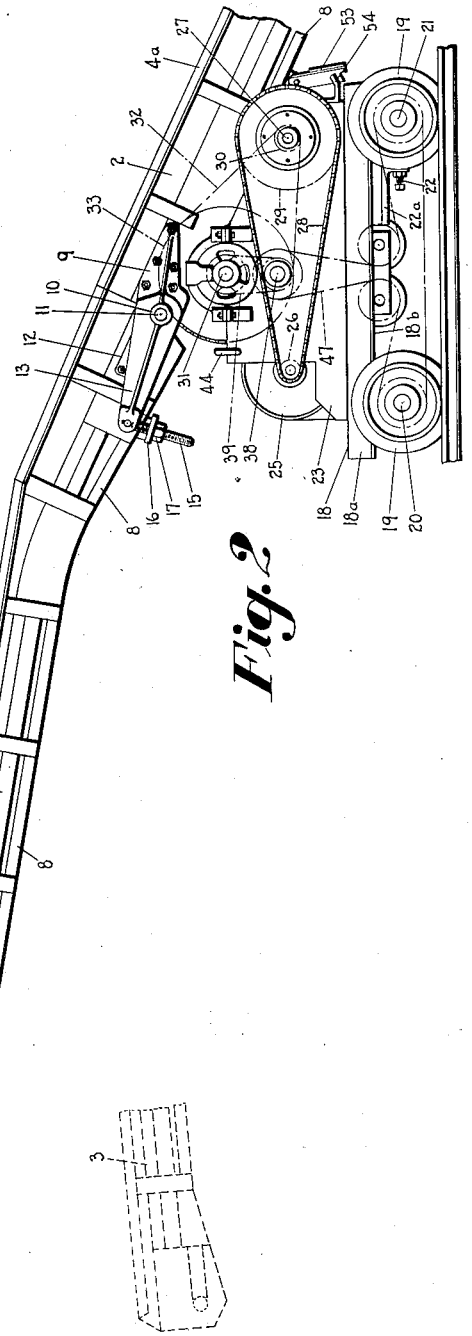

Patented Apr. 16, 1935

1,997,588

UNITED STATES PATENT OFFICE 1,997,588

PIT CAR LOADER

Nils D. Levin, Columbus, Ohio, assignor to The Jeffrey Manufacturing Company, Columbus, Ohio, a corporation of Ohio Application August 17, 1929, Serial No. 386,647
Renewed June 11, 1934

9 Claims. (Cl. 198—233)

The invention relates to conveying mechanism for handling material, and in the particular embodiment of the invention herein disclosed, there is shown a pit car loader designed for use in coal mines where the broken down coal is loaded out from the heading into the pit cars.

It has for its object to provide a material handling conveyor which is simple and rugged in construction, and adapted to be conveniently and economically handled in the mine, and to be readily transported from place to place in the mine over the floor or trackway.

The machine herein disclosed is made up of three essential features with modifying accessories, namely, a carrier, here shown as a wheel-mounted truck frame adapted to run upon tracks, a supporting frame for the conveyor parts so mounted as to swivel horizontally on the carrier, and a conveyor frame with any usual conveying devices or flights mounted upon the supporting frame so as to tilt on a horizontal pivot mounting in vertical planes. An important feature of the machine is the construction by which both the carrier and the conveyor may be driven from a single motor mounted upon the swivelling conveyor frame, the driving connections being such that even though the conveyor be swivelled in a horizontal plane so that it is angularly disposed to the center lines of the carrier or truck, neither the carrier drive nor the conveyor drive will be interrupted.

Other novel features and mechanisms will be hereinafter pointed out.

In order that the invention may be clear to those skilled in the art, there is shown in the accompanying drawings one embodiment of my invention, but since it is obvious that mechanical changes in and departures from the construction shown may be made, such disclosure is to be regarded as illustrative, and in no sense restrictive of my invention.

In the drawings:

Figure 1 is a view in side elevation of a machine embodying my invention, the discharge end of the conveyor frame being broken for convenience of illustration.

Figure 2 is a view in side elevation, on a larger scale than Figure 1, to show the rearward or discharge end of the conveyor and truck, the drive mechanisms, and the adjusting means for moving the conveyor for different heights of coal; the forward or loading end of the conveyor being broken away for convenience of illustration. The end of the conveyor is shown in a lower adjusted position in dotted lines.

Figure 3 is a view in plan of the machine, parts being broken away to show the driving and adjusting mechanisms.

Figure 4 is a view in section, on an enlarged scale, longitudinally of the central portion of the conveyor and truck, on substantially the line IV—IV, Figure 3, to show the relation of the parts and the driving instrumentalities for truck and conveyor flight.

Figure 5 is a transverse sectional view on substantially the line V—V, Figure 4, to show the truck; conveyor mounting; conveyor, and driving parts and connections.

A truck of suitable construction is provided, that shown comprising a frame made up of floor section 18, depending side members 18a, and horizontal flanges 18b, all preferably of a single piece or sheet. Flanges 18b rest upon and are bolted or otherwise suitably secured to axle boxes traversed by supported axles 20 and 21 having track wheels 19. In the embodiment of the invention shown herein the truck is designed to run upon and exert traction on mine tracks, but it will be understood that types of supporting and traction members other than track and traction wheels might be used.

The axles 20 and 21 are relatively adjustable to take up drive chain slack, the axle 21 shown at the right, Figure 4, and its boxes being mounted for sliding adjustment in the truck frame, by means of take-up screws 22 carried by depending brackets 22a and impinging the axle boxes on each side of the frame, jam nuts being provided on each side of the bracket to permit the screws to be set up or let off for relative adjustment of the axles in one or the other direction, with consequent tightening or loosening of the drive chain.

Mounted for rotation about a vertical center upon the floor section 18 of the truck frame is a supporting frame made up, in this form of the invention used for illustrative purposes, of a plate 24 resting upon section 18 and having the vertical side members 23, as here shown, integral with the plate 24. Substantially centrally of top plate 18 of the truck, as here shown, the plate has secured thereto a ring 45 and a superposed ring 45a of larger diameter by means of bolts 45b. The horizontal plate 24 has an aperture slightly larger than the outside diameter of ring 45, marginal portions of plate 24 at the aperture underlying the outer marginal portions of ring 45a. In this manner, plate 24 and the structure supported thereby is rotatable on plate 18 about a vertical axis defined by ring 45, ring 45a providing a positive interlock with plate 24 so that vertical displacement of the latter relative to plate 18 is prevented. Plate 18 is cut-away inside of ring 45 so that a hollow swivelling connection is provided between plates 18 and 24, the opening being designated at 46, Figure 4, and being bounded by rings 45 and 45a and the edge of the opening in plate 18.

It will be seen that the ring pivot thus formed furnishes a large pivot bearing for the supporting frame, and thus, with the extended bearing contact between the truck frame floor section 18 and the plate 24 of the supporting frame, gives an extremely rugged and stable connection between the relatively rotatable parts and one which will maintain equally satisfactory conditions of the parts carried thereby in various positions of adjustment.

Mounted upon the supporting frame pivoted upon the truck frame is a motor 25 which may be of any preferred type, an electric motor being here shown conventionally, which motor will, of course, have the usual power leads to a source of supply. The motor armature shaft has a sprocket 26 coupled by chain 28 with a sprocket 29 mounted upon the countershaft 27. Said shaft 27 at its opposite end is provided with a sprocket 30, which is connected by a chain 32 with the driving shaft 31 through a sprocket 33 which constitutes the main conveyor drive mechanism. The sprocket 33 is thrown in and out of driving relation with the shaft 31 by means of the clutch 34 provided with an actuating lever 35. The clutch shown is an ordinary jaw clutch, but obviously any clutch coupling device which will tie the parts together or release them can be used.

The main conveyor drive shaft 31 is provided with sprockets 36 and 37 which, as best shown in Figures 4 and 5, engage the lower runs of the conveyor chains 6 to drive them.

The truck drive shaft 38 is located directly below the main conveyor drive shaft 31, and above the center of the pivot mounting 45 of the supporting frame. The shaft is actuated by means of a chain 39 engaging a sprocket 41 on the truck drive shaft 38 and a sprocket 40 preferably formed integral with the hub of the sprocket 33. Mounted and freely rotatable upon the shaft 38 is a sheave 42, here designed as a chain sprocket sheave, this sheave 42 being disposed centrally above the pivot 45 of the supporting frame and controlled by a suitable clutch as the jaw 43, provided with an operating lever 44, which extends transversely to both sides of the frame so that the clutch can be actuated to couple the sprocket sheave and the truck drive shaft from either side of the machine.

It has been pointed out that the supporting frame is so mounted on the truck frame that it may be rotated about the large pivot mounting 45. This pivot mounting has centrally thereof the aperture 46 through which an axle drive chain 47, engaging sheave 42, extends, passing around idler sheaves 48 and 49 mounted upon parallel transverse shafts 50 supported in hangers 50a and 50b depending from and secured to the underside of the truck plate 18, as best shown in Figure 5.

The axles 20 and 21 are provided with sprocket sheaves 51 and 52, keyed thereon and lying in the same vertical plane with the idler sheaves 48 and 49, so that upon actuation of the truck drive shaft 38 the sprocket sheave 42 will actuate the chain 47 and, through the axle sprockets 51 and 52, drive the truck axles and wheels.

The driving element, as here shown, is a single strand open-link chain 47, and it has been found that with this connection or an equivalent one, the truck drive can be successfully operated, even though the swivelling supporting frame which carries the conveyor and the drive shaft is swung out of line or out of angle to the truck frame. A chain of this character will flex readily in all trans-axial directions, and, being thus universally flexible, will not ride the engaging teeth on the sheaves as it can respond to twisting sufficiently to insure its remaining in operative engagement with the sheaves.

An important feature of the present development is the provision of a single motor mounted on the swivelling supporting frame and coupled by suitable drive connections with the conveyor parts to be driven, and the truck drive. The arrangement is such that driving of the conveyor draft device or driving of the truck from this single motor will not be interfered with even if the supporting frame is swung out of line with the longitudinal and transverse centers of the truck. This is important for the reason that it is desirable to be able to drive the truck in different positions of angular adjustment of the conveyor frame, and it is equally important to be able to effect driving of both the truck wheels and the conveyor mechanism in these different positions. One situation in which this adaptability for manipulation and driving of the machine described is in traversing curves in the mine track where it is necessary to angle the conveyor frame relative to the truck to enable it to take the curve without engaging the walls of the entry or passage and blocking the movement of the truck, as is frequently the case where the conveyor cannot be swivelled to accommodate it to the curvature of the passage.

Mounted for tilting movement on the drive shaft 31, heretofore described, is the conveyor frame, made up of the forward receiving portion 1, the middle portion 2, and the rearward or discharge portion 3. The general conveyor construction may be of any usual type, the portion 1 being so designed as to furnish a satisfactory receiver for the material being handled. Preferably the portion 1 is so designed relative to the rest of the machine, as normally to stand in a substantially horizontal position under ordinary working conditions. The middle portion 2 of the conveyor is normally disposed in the inclined position shown during usual working conditions; and from the rear end of portion 2, the rearward or discharge end 3 of the conveyor projects in a substantially horizontal position, provision being made, as will later appear, for adjusting the height of the rear end of portion 3 through a range sufficient to meet different working conditions.

The conveyor comprises a substantially U-shaped floor section 4, having outwardly flared side sections 4a, lengthwise thereof, to form a material receiving trough of good cross section and capacity. Angle strips 5 are preferably located, as shown in Figure 5, in the angle between the edges of the floor section 4 and the side sections 4a to strengthen the conveyor, and particularly to protect the conveyor chains 6 from injury, the flights 7 being disposed in a usual manner between and moved by the chains. The return runs of the chains 6 will preferably be supported beneath the conveyor by angle strips 9 secured in place in any suitable manner.

The rearward or discharge portion 3 of the conveyor is, as stated, preferably adjustable to enable it to be brought to proper position between the mine roof and the top of the car.

Head room in mines, and mine cars, vary in height, and it is essential that a conveyor frame construction be provided which may be conveniently adjusted, as to its discharge end, to meet varying conditions, without interrupting its operation and which, when adjusted to its different positions, will not interfere with the movement of the flights, and will preserve always the same rigidity under its load. Furthermore, simplicity and ruggedness of make-up and ease of adjustment are highly desirable.

In the embodiment of the invention here shown, brackets 9 are provided (Figures 1, 2, and 3), secured in any suitable manner to the middle portion 2 of conveyor frame near the rear end thereof. The brackets 9, one on each side of the conveyor frame, are provided with bearings 10 which rockably receive studs 11 carried by brackets 12 rigidly secured one at each side, to the end of the discharge portion 3 adjacent the rear end of middle portion. Rigid, and preferably integral, with the brackets 9 are arms 13 which extend rearwardly along the sides of the conveyor portion 3 (Figures 1, 2 and 3) and carry eye-bolts 14 pivoted in their forked ends, the eye-bolts being provided with relatively long depending threaded portions 15. Mounted on the portions 15 for free movement is a cross-bar 16, which engages the bottom of and supports the discharge portion 3 of the conveyor. Suitable nuts 17 threaded on portions 15 support the bar 16 and provide for its up and down adjustment to vary the angular position of the discharge portion 3I relative to the horizontal.

It will be apparent that the construction is simple, both as to manufacture and assembly, and its manipulation for adjustment can be readily accomplished with an ordinary wrench and without taking down or disturbing the parts, so that unskilled persons can handle it for adjustment and without danger of deranging or breaking the parts.

The floor plates of discharge portion 3 and middle portion 2 of the conveyor frame meet at a line coincident with the centers of studs 11, the portion 3 being shown in its uppermost position in the drawings. The lower parts of the portions 2 and 3, particularly the angle strips 8 for the return runs of chains 6 will be cut away, as shown clearly in Figure 4, to provide clearance as the portion 3 is swung downwardly in making adjustment of the discharge end for different heights. Of course, as section 3 is swung downwardly, small angular breaks will appear between the adjacent ends of the side walls of this section and section 2. This, however, will not affect in any appreciable degree the passage of material from section 2 to section 3, although, if desired, cover flaps for the breaks may be provided.

As has been mentioned, section 2, which supports sections 1 and 3, is mounted on shaft 31. The conveyor as a whole may be swung about shaft 31, thus simultaneously lowering and raising, or vice versa, sections 1 and 3, respectively. A prop 53 pivoted to section 2 is provided with a number of recesses for selective engagement with a flange 54 secured to the carrier frame so that the conveyor may be adjusted to and retained in its operative and travelling positions. In the one instance section 1 will rest upon or at least be positioned in close proximity to the mine floor and section 3 will be raised, while in the other instance section 3 will be lowered and section 1 lifted sufficiently to clear the mine tracks.

The construction is extremely rugged and simple and well-fitted to stand up to the work without breakage or derangement.

Such changes and departures as are within the skill of the mechanic may be made from the construction herein shown and described without departing from the range of my invention as defined in the appended claims.

I claim:

1. In a machine of the class described, a wheel mounted truck, a supporting frame above the truck, a hollow vertical swivelling connection between the frame and truck, a horizontal shaft revolubly mounted on said frame, a conveyor comprising an elongated frame mounted for swinging adjustment about said shaft, said conveyor also comprising an endless draft device circulatory over said frame, means on the shaft engaging the draft device to drive the latter, a rotary member rotatable on said shaft, a motor in driving connection with said rotary member, clutch means between the rotary member and shaft, a second shaft rotatably mounted on the frame parallel to the first and above said swivelling connection, a drive connection between said rotary member and said second shaft, a wheel free on said second shaft above said swivelling connection, clutch means between said second shaft and wheel, and a universally flexible endless drive member engaging said wheel and extending through said swivelling connection to engage driving means for the truck wheels.

2. In a machine of the class described, a wheel mounted truck, a supporting frame above the truck, a hollow vertical swivelling connection between the frame and truck, a horizontal shaft rotatably mounted on the frame above said swivelling connection, a wheel rotatable on said shaft, clutch means operative between the shaft and wheel to connect the wheel to the shaft or disconnect it therefrom, a universally flexible endless drive member engaging said wheel and extending through said swivelling connection to engage driving means for the truck wheels, a second shaft rotatably mounted on said frame, an elongated conveyor supported by the frame for rocking movements about a transverse axis coincident with the axis of said second shaft, said conveyor including an endless material engaging draft device, drive wheels on said second shaft engaging said draft device to drive the same, a motor on said frame, and drive connections between said motor and said shafts including clutch means for controlling said second shaft whereby the conveyor and the truck may be driven independently or simultaneously upon appropriate manipulation of the two clutch means.

3. In a portable loading machine, the combination with a truck having a platform with a circular opening therein, a frame having a bottom plate resting on said platform over a widely extended area and having a circular opening therein registering with said first-named opening, mechanism rigidly connected to said platform at the edges of the circular opening therein to provide an annular groove for the edges of the circular opening in the bottom of said frame to fit into thereby securely connecting said frame to said platform and confining said frame to move rotationally and horizontally relative to said platform, an elongated conveyor mounted on said frame to move bodily therewith on the vertical axis at the center of said openings, truck-propelling apparatus comprising a universally flexible endless driving member extending through said openings, and motor operated mechanism mounted on said frame for driving said conveyor and said truck-propelling apparatus.

4. In a portable loading machine, the combination with a wheeled truck, of a supporting frame swivelled thereto for rotation on a vertical axis, means for preventing tilting of said frame relative to said truck, an elongated conveyor frame pivoted intermediate its ends to said supporting frame on a horizontal axis, an endless traveling conveyor extending from the forward end of said conveyor frame in advance of the truck to the rear end of the conveyor frame at the back of said truck, a motor on said supporting frame, operator controlled driving connections between said motor and said traveling conveyor for operating the latter irrespective of the tilted position of said conveyor frame on said horizontal axis and irrespective of the angular position of said frame relative to said truck, truck-propelling apparatus comprising a driving sheave mounted on said supporting frame, an endless universally flexible chain extending downwardly from said sheave at said vertical axis and connected to the wheels of the truck, and operator-controlled means for connecting said motor to said truck-propelling apparatus to operate the same independently of the operation of said conveyor and irrespective of the angular position thereof on said horizontal and vertical axes relative to said truck.

5. In a portable loading machine, the combination with a wheeled truck, of a supporting frame swivelled thereto for rotation on a vertical axis; means for confining said frame to a fixed relation, other than rotational, to said truck by preventing tilting of said frame relative to said truck and by preventing upward movement of said frame relative to said truck; an elongated conveyor comprising an endless conveyor element mounted on said supporting frame to move bodily therewith, a motor on said frame, operator controlled driving connections between said motor and said conveyor element, truck propelling mechanism comprising an endless universally flexible chain extending through the bottom of said frame and the top of said truck at said vertical axis and connected to the wheels of the truck, and operator-controlled connections between said motor and said truck-propelling mechanism to effect operation of the latter independently of the operation of said conveyor element and while said conveyor occupies any one of various angular positions throughout a wide range of angular adjustments of said conveyor relative to said truck on said vertical axis.

6. In a loading machine, the combination with a wheel mounted truck, of a supporting frame swivelly mounted on said truck to rotate relative thereto on a vertical axis, an elongated conveyor pivotally mounted intermediate its ends on said frame to tilt relative thereto on a horizontal axis, means at the swivelling connection between said frame and said truck for preventing tilting movement of said frame relative to said truck and also preventing upward movement of said frame relative to said truck when the receiving end of said conveyor is tilted up off the ground on said horizontal axis, truck-propelling apparatus comprising an endless flexible driving element extending through the bottom of said frame and the top of said truck at said vertical axis, and motor operated mechanism for driving said conveyor and said truck-propelling apparatus.

7. In a loading machine, the combination with a wheel mounted truck, of a supporting frame swivelly mounted on said truck to rotate relative thereto on a vertical axis, an elongated conveyor frame pivotally mounted intermediate its ends on said frame to tilt relative thereto on a horizontal axis, an endless conveyor on said conveyor frame, a horizontal drive shaft on said horizontal axis, driving connections between said shaft and said conveyor, a motor on said supporting frame, power transmission mechanism between said motor and said shaft and comprising a rotary element mounted on said shaft for rotation relative thereto, a clutch for connecting said rotary element to said shaft to drive the latter and said endless conveyor, truck-propelling apparatus comprising an endless flexible driving element extending through the top of the truck at said vertical axis, and an additional clutch for connecting said power transmission mechanism to said truck-propelling apparatus to operate the latter independently of the operation of said endless conveyor.

8. A machine of the class described comprising a wheeled truck including structure providing a horizontal top portion, a frame having a base and opposite side portions rising from said base, the base resting on said top portion, said base and top portion being provided with registering openings and one of them having rigid therewith a ring passed through the opening of the other to provide a vertical swivel connection, means limiting vertical displacement of the frame relative to said top portion, a shaft journalled in said side portions above said openings, an elongated gathering conveyor overlying said frame and supported by said side portions for movement with said frame on the swivelling axis of the latter, a pair of sheaves mounted below said top portion and below said openings on transverse axes spaced longitudinally of the truck, a sheave on said shaft, sheaves connected to the truck wheels and coaxial therewith, all of said sheaves being in the same vertical plane, an endless universally flexible chain engaging all of said sheaves and guided through said openings by said sheaves mounted below said top portion, a motor on said frame, driving connections between the motor and said shaft whereby to propel the truck by means of said chain, connections between said motor and conveyor whereby to drive the latter, said connections being controllable and the truck propelling and conveyor driving mechanisms being operative in various angular relations of the frame to the truck.

9. In a machine of the class described comprising a wheeled truck including a platform having a top horizontal surface of large area above the wheels, a frame comprising a bottom plate of large area resting on said platform surface and comprising also opposite side walls rising from said bottom plate, said platform and bottom plate having registering openings and one of them having rigid therewith a ring passed through the opening of the other to provide a vertical swivel connection, means limiting vertical displacements of said frame relative to said platform, a shaft journaled in said side walls above said openings, an elongated gathering conveyor overlying said frame and supported by said side walls for movement with said frame on the swivelling axis of the latter, a pair of sheaves mounted below said platform and below said openings on transverse axes spaced longitudinally of the truck, a sheave on said shaft, sheaves connected to the truck wheels and coaxial therewith, all of said sheaves being in the same vertical plane, an endless universally flexible chain engaging all of said sheaves and guided through said openings by said sheaves mounted below said platform, a motor on said frame, driving connections between the motor and said shaft whereby to propel the truck by means of said chain, connections between said motor and conveyor whereby to drive the latter, said connections being controllable and the truck propelling and conveyor driving mechanisms being operative in various angular relations of the frame to the truck.

NILS D. LEVIN.